(12) United States Patent
Weinstein

(10) Patent No.: US 6,640,926 B2
(45) Date of Patent: Nov. 4, 2003

(54) ELBOW SILENCER

(75) Inventor: Jonathan Weinstein, Wantagh, NY (US)

(73) Assignee: Industrial Acoustics Company, Inc., NY (US)

( * ) Notice: Subject to any disclaimer, the term of this patent is extended or adjusted under 35 U.S.C. 154(b) by 0 days.

(21) Appl. No.: 09/750,746

(22) Filed: Dec. 29, 2000

(65) Prior Publication Data

US 2002/0084138 A1 Jul. 4, 2002

(51) Int. Cl.⁷ .................................................. E04F 17/04
(52) U.S. Cl. ....................................................... 181/224
(58) Field of Search ................................ 181/224, 210, 181/212, 225, 226, 227, 228, 229

(56) References Cited

U.S. PATENT DOCUMENTS

| | | | | | |
|---|---|---|---|---|---|
| 5,563,382 A | * | 10/1986 | Choyce | ........................ | 181/320 |
| 6,024,189 A | * | 2/2000 | Heuser | ........................ | 181/264 |
| 6,464,036 B1 | * | 10/2002 | Yenner | ........................ | 181/229 |

* cited by examiner

Primary Examiner—Kimberly Lockett
(74) Attorney, Agent, or Firm—Morgan & Finnegan, LLP

(57) ABSTRACT

An elbow silencer is disclosed comprising a casing and a baffle defining a flow channel. The elbow silencer is constructed to be modular so that two or more complementary elbow silencers are capable of engaging in a nesting relationship. The nested, complementary elbow silencers comprise substantially similar flow channels to produce predictable acoustic attenuation, self generated noise and pressure loss.

5 Claims, 5 Drawing Sheets

ELBOW SILENCER

FIELD OF INVENTION

The present invention relates to the field of acoustic duct silencers, and more particularly, to modular elbow silencers.

BACKGROUND OF THE INVENTION

The use of high-performance Heating Ventilation and Air Conditioning (HVAC) systems has resulted in unacceptably high noise levels in buildings. Obtrusively loud noise from ducts used in an HVAC system can effect the overall environment in a building by transmitting unwanted sound throughout the building. Additionally, air flowing through abrupt changes in the cross-sectional dimensions of a duct can also produce sound. Accordingly, there has been a longstanding problem with the amount of sound transmitted through the ducts of an HVAC system.

Various attempts have been made to minimize the sound propagation in straight air ducts. One such attempt provides a sound attenuating silencer lined on the inside of the straight air duct.

Sound attenuating silencers have also been used in elbow ducts to reduce noise propagation. Elbow silencers currently used in the industry are modified standard linear silencers which are typically bent at an angle of approximately ninety degrees.

FIG. 1A illustrates a conventional one-piece elbow silencer 110 currently used in industry which typically includes a casing having a baffle 120 which defines two flow channels or paths 130 and 140. With this construction, each air or sound flow channel or path 130 and 140 defined by the baffle 120 has a different length, making pressure loss, self generated noise and sound attenuation unpredictable and unreliable.

Another conventional arrangement of elbow silencers is illustrated in FIG. 1B. The arrangement shown in FIG. 1B uses two elbow silencers 150 and 160 which are positioned in a nested relationship. The air or sound flow channels 130 and 140 of the two elbow silencers 150 and 160 are similar to the flow channels of the elbow silencer 120 shown in FIG. 1A because each defines a different length which, again, makes pressure loss, self generated noise and sound attenuation unpredictable and unreliable.

Turning vanes have also been used in an attempt to minimize the sound propagation in existing elbow air ducts. Turning vanes are baffles that are inserted into a single duct which define flow channels for the air flow. However, turning vanes are impractical because they require insertion of multiple baffles into an existing single duct. Turning vanes are also inconsiderate of space constraints and it is time consuming and expensive to insert the baffles into a single duct.

SUMMARY OF THE INVENTION

The present invention provides a modular acoustic elbow silencer which is configured to attenuate sound and is capable of being nested with another, complementary elbow silencer. According to one embodiment, an elbow silencer for attenuating noise associated with a fluid medium passing through said elbow silencer comprises a casing and a baffle. The casing includes sides that define an inlet end and an outlet end. The baffle is disposed within the casing and defines a flow channel through which the fluid medium passes. The elbow silencer is capable of being nested with a complementary elbow silencer having substantially the same flow channel.

DETAILED DESCRIPTION OF THE INVENTION

Figure 1A:
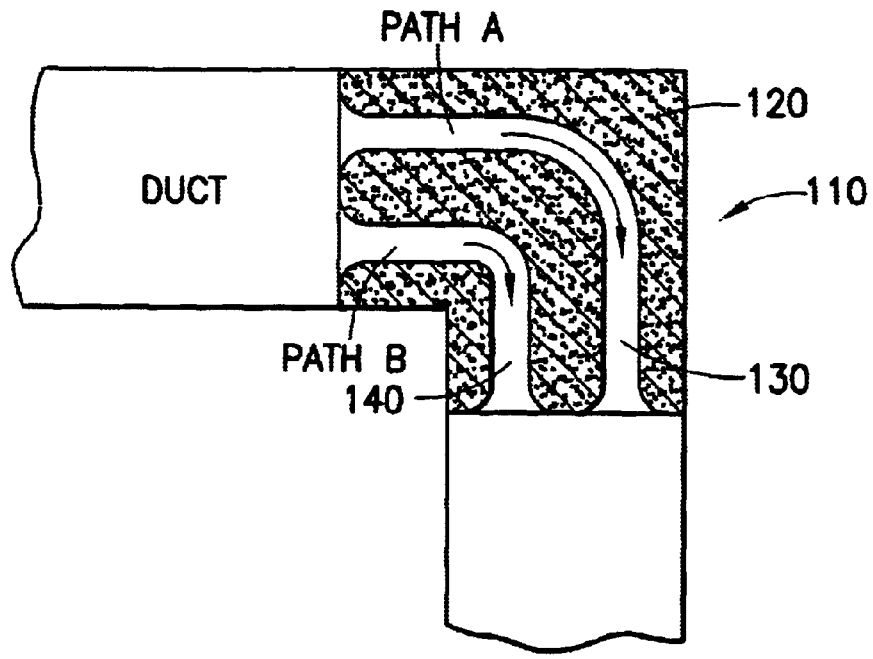
FIG. 1A is a cross-sectional view illustrating a conventional elbow silencer.
Figure 1B:
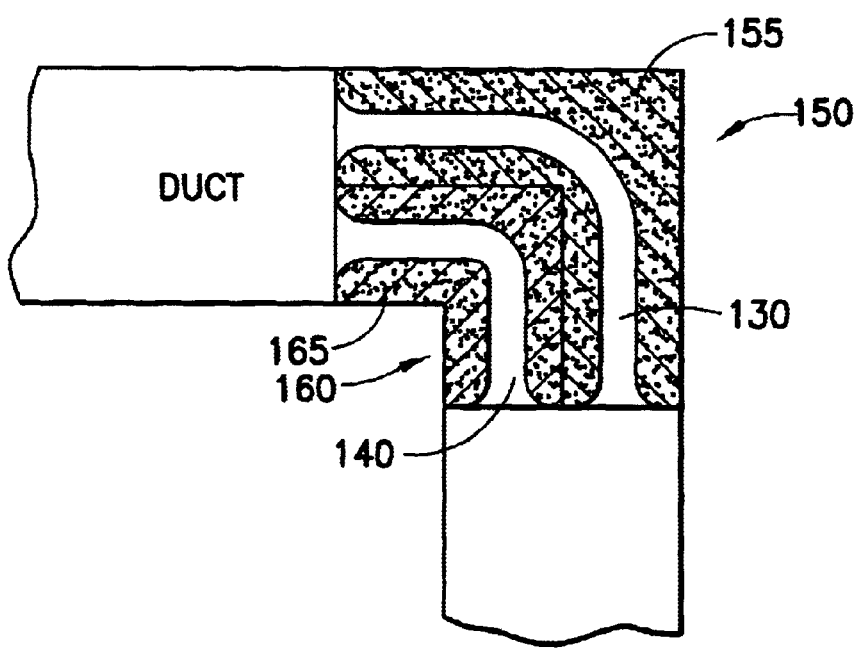
FIG. 1B is a cross-sectional view illustrating two conventional elbow silencers engaged in a nested relationship.

While this invention is susceptible of embodiments in many different forms, there is shown in the drawings and will hereinafter be described in detail embodiments of the invention, and modifications thereto, with the understanding that the present disclosure is to be considered as an exemplification of the principles of the invention and is not intended to limit the invention to the embodiments illustrated.

Figure 2A:
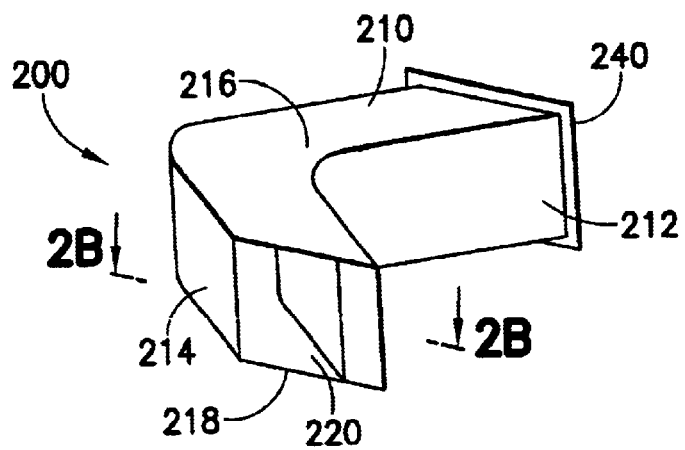
FIG. 2A is a perspective view illustrating an elbow silencer of the present invention.
Figure 2B:
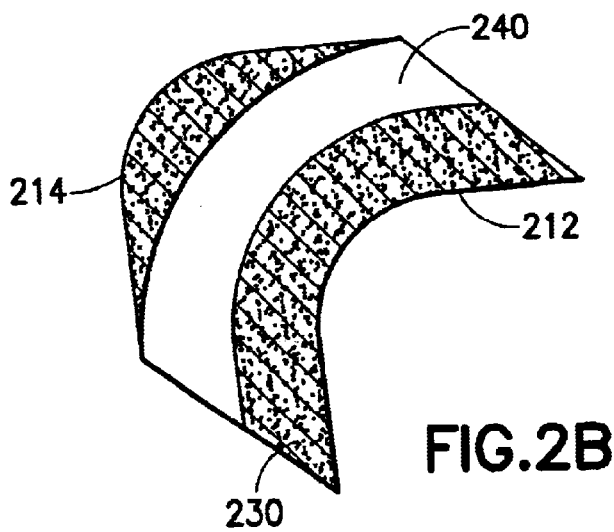
FIG. 2B is a cross-sectional view taken along line 2—2 in FIG. 2A.
Figure 2C:
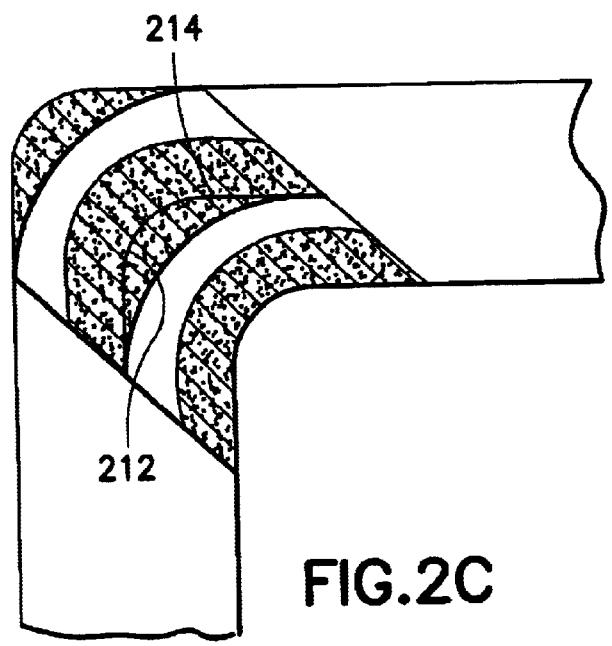
FIG. 2C is a cross-sectional view illustrating the nesting of two complementary elbow silencers (of the type in FIG. 2B) having curved front and back sides engaged in a nested relationship.

An acoustic elbow silencer according to one embodiment of the invention is shown in FIGS. 2A, 2B, and 2C indicated generally by reference number 200. The elbow silencer 200 is shown as comprising a casing or shell 210, typically of rectangular cross-section although other shaped cross-sections may be used, having opposed, upstanding front and back sides 212 and 214 and top and bottom sides 216 and 218 that form an inlet end 220 and an outlet end 240. The casing sides 212, 214, 216 and 218 are impervious to the flow of fluid therethrough. The casing 210 may be constructed of a variety of materials such as, for example, galvanized sheet metal.

Positioned on the inner periphery of the casing 210 is a baffle 230 to attenuate sound waves passing through air passage 240. In one embodiment, the baffle 230 is a perforated facing plate behind which is positioned an acoustical filler material, such as, for example, foam, rock wool, inorganic wool or fiberglass insulation or other fibrous acoustically absorptive bulk material or packing of characteristics sufficient to obtain the specified acoustic performance and be packed under not less than 5% compression to eliminate voids due to vibration and settling. The filler material should be inert, vermin and moisture proof.

Alternatively, the baffle(s) 230 is a resistive sheet type of duct liner such as, for example, a packless acoustic silencer comprising a liner in which acoustical flow resistance is concentrated in a thin face sheet separating the flow passage and acoustical cavity. Further information about the packless silencer is set forth in U.S. Pat. No. 4,287,962, issued on Sep. 8, 1981 to Uno Ingard, James A. Morgan and Martin Hirschorn for a Packless Silencer which is incorporated herein by reference.

Figure 9A:
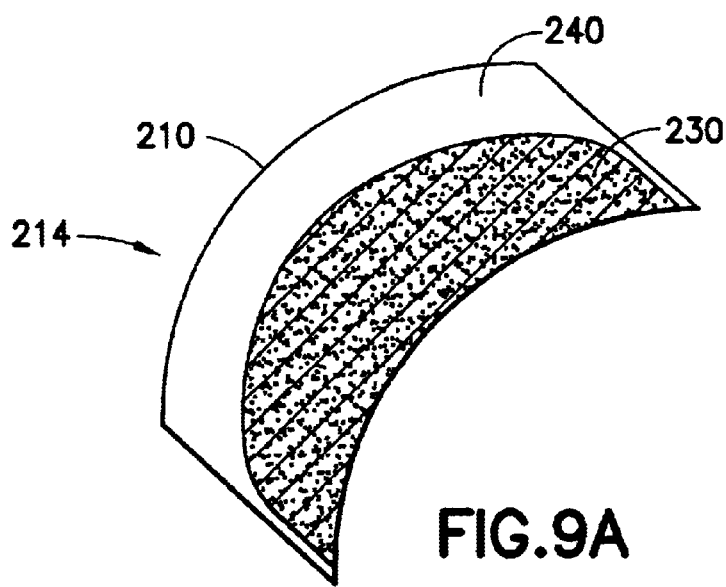
FIGS. 9A and 9B are a cross-sectional views of other embodiments illustrating the flow channels defined between the baffle and an inner side of the casing of an elbow silencer.
Figure 9B:
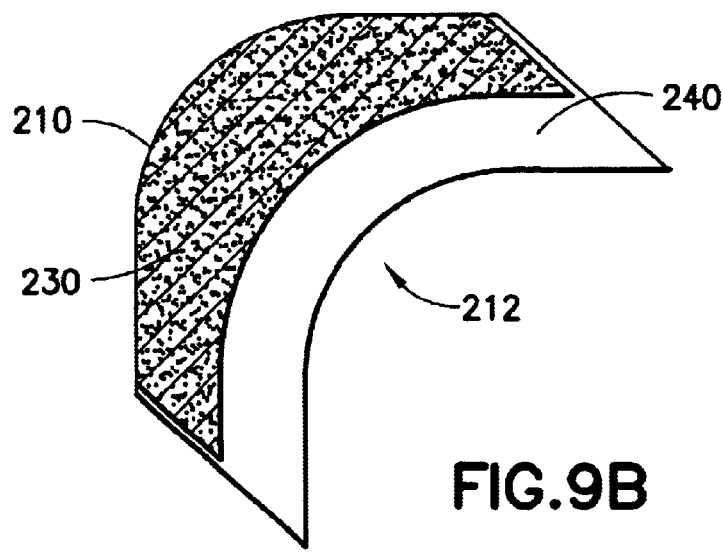

The baffle(s) 230 define a U-shaped flow channel, spacing or path 240 having a predetermined length, height and sized opening that are selected to predictably attenuate sound at a predictable and determined frequency and to maximize turning radius and path length. The flow channel 240 is dimensioned to ensure uniform airflow through the baffle 230 and to minimize noise breakout. The material, size and thickness of the silencer as well as the defined channel serve to determine or predict sound attenuation, self generated noise and pressure loss. The flow channel can be defined between two baffles (i.e. FIG. 2B) or between a baffle and the inner side of the casing as shown in FIGS. 9A and 9B.

The elbow silencers 200 are constructed so as to be complementary and modular or dimensionally repeatable so that adjacent elbow silencers 200 are capable of being nested together such that multiple widths can be accommodated.

Figure 3:
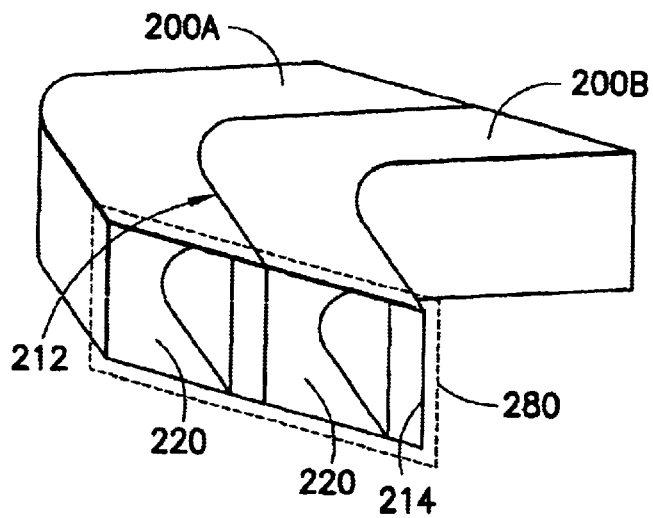
FIG. 3 is a perspective view illustrating two complementary elbow silencers engaged in a nested relationship.

FIG. 3 illustrates a pair of elbow silencers 200A in a nesting relationship. The front side 212 of elbow silencer 200A and the back side 214 of elbow silencer 200B include complementary or mating surfaces. Each elbow silencer nests with an adjacent elbow silencer including the same dimensions and defining substantially similar flow channels. As illustrated in FIG. 3, the inlet and outlet ends of two or more nested elbow silencers are juxtaposed and aligned so as to form a common end plane 280. In one embodiment, the end planes 280 formed by the inlet and outlet ends of nested silencers are parallel.

Figure 4:
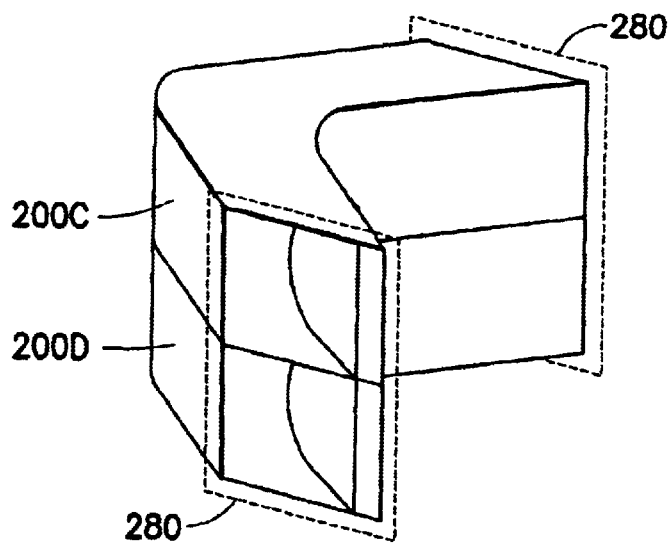
FIG. 4 is a perspective view illustrating two complementary elbow silencers engaged in a stacked relationship.
Figure 5:
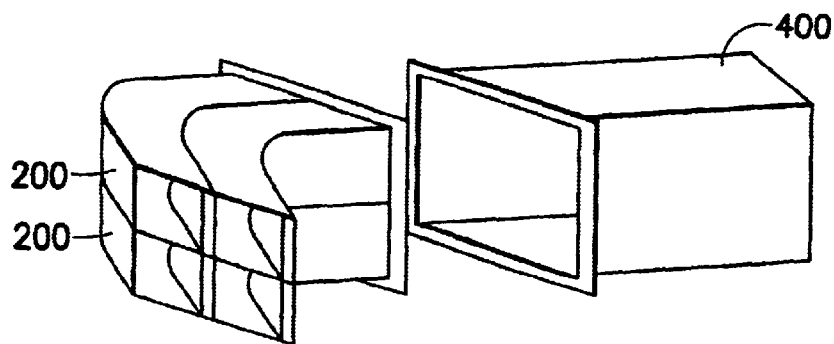
FIG. 5 is a perspective view illustrating four complementary elbow silencers engaged in a nested and stacked relationship.

As illustrated in FIGS. 4 and 5, the elbow silencers 200C and 200D can also be stacked, such that multiple heights may be accommodated, or nested and stacked.

Figure 6:
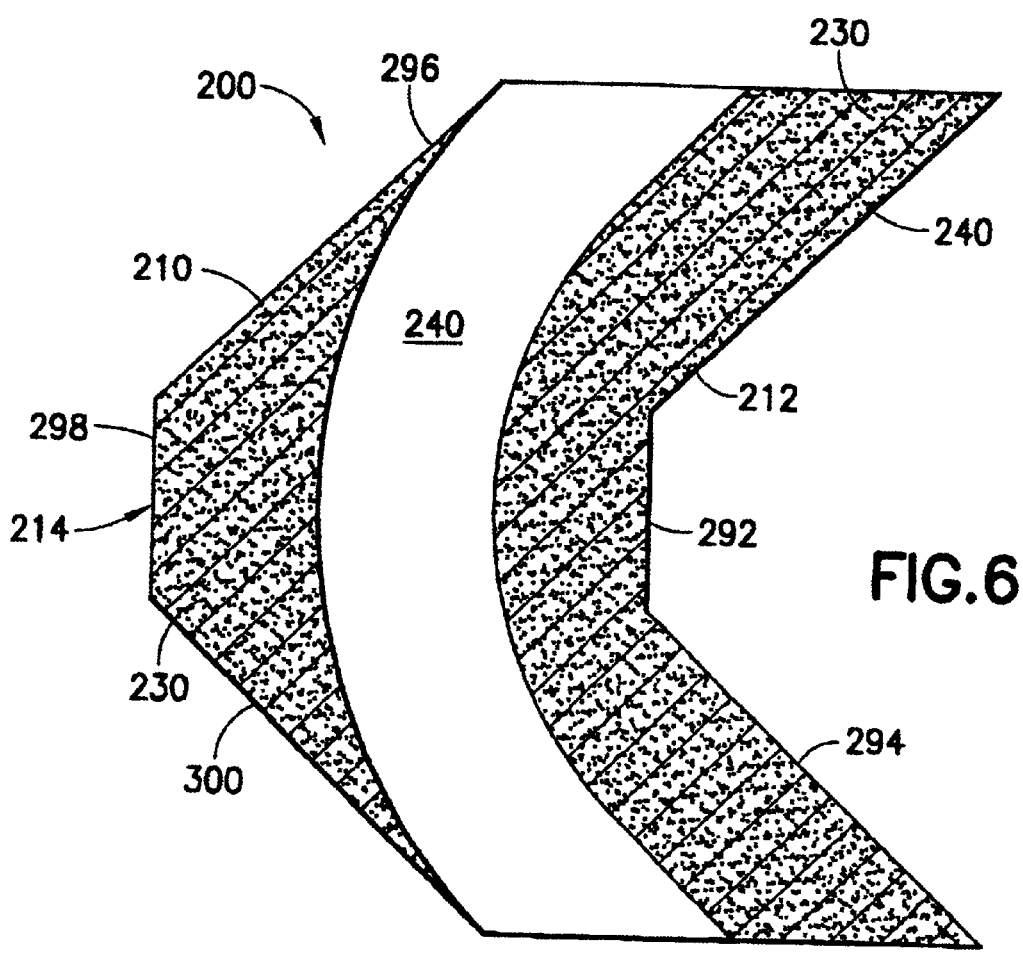
FIG. 6 is a cross-sectional view illustrating another embodiment of the elbow silencer having a plurality of panels making up the front and back sides.

In one embodiment as shown in FIGS. 2B and 2C, the complementary and mating front and back sides 212 and 214 of the elbow silencer are curved. In an alternate embodiment as shown in FIG. 6, the front and back sides 212 and 214 of the elbow silencer 200 include a plurality of walls or panels 290, 292, 294, 296, 298, and 300. The walls 290, 292, and 294 of the front side 212 of one elbow silencer mate with or complement the walls 296, 298, and 300 of the back side 214 of a dimensionally identical elbow silencer to define a nesting relationship.

Figure 7:
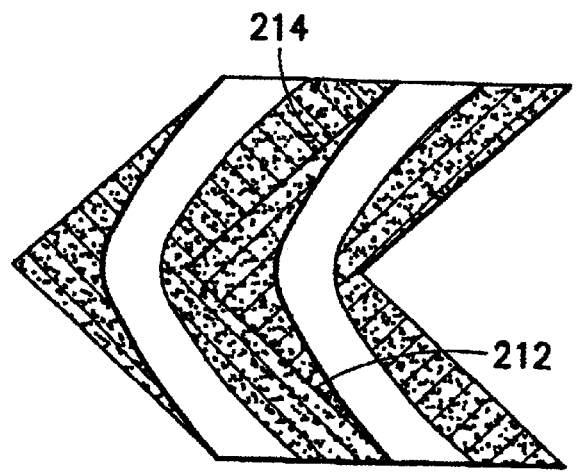
FIG. 7 is a cross-sectional view illustrating two complementary elbow silencers having front and back sides with two walls orthogonal to each other engaged in a nested relationship.
Figure 8:
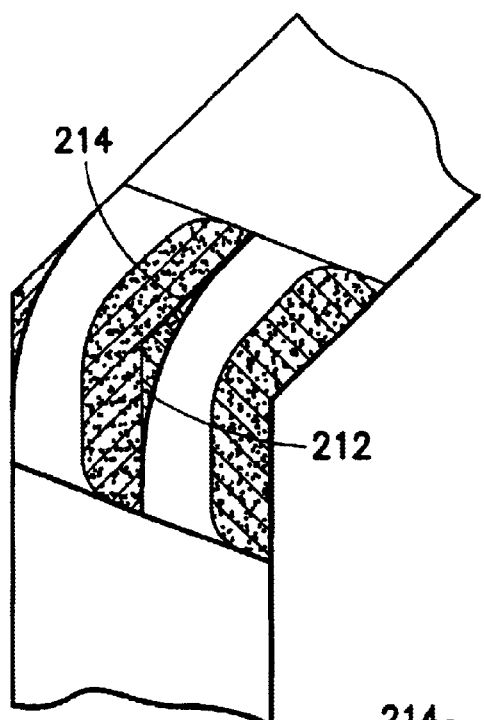
FIG. 8 is a cross-sectional view illustrating two complementary elbow silencers having front and back sides with two walls at an angle other than ninety degrees engaged in a nested relationship.

FIGS. 7 and 8 show two alternative embodiments for the mating or nesting of the front and back sides 212 and 214 of elbow silencers, i.e. having walls or panels at a right angle with respect to each other (FIG. 7) or at angles of other than ninety degrees (FIG. 8). Although, any mating surfaces can be used as long as the flow channels 240 of nested or stacked silencers 200 are substantially similar so that the acoustic and aerodynamic performance of each elbow silencer is predictable.

The performance of a nested, stacked or nested and stacked group of elbow silencers have acoustic and aerodynamic characteristics substantially similar to a single elbow silencer. This enables predictable sound attenuation, self generated noise and pressure loss characteristics. Unlike conventional elbow silencers having one elbow silencer with two different flow channels as shown in FIG. 1A, the nested or stacked silencers of the present invention enables one to predict or account for the performance of a plurality of silencers because all of the flow channels have the same performance and characteristics.

Also, since each elbow silencer has its own casing, there is no need to insert the elbow silencers of the present invention into a single metal duct as required by turning vanes.

Multiple nested elbow silencers are attachable to mating ductwork 400 as illustrated in FIG. 5. If the end planes 280 defined by the inlet and outlet ends of juxtaposed elbow silencers are parallel, the mating ductwork would have complementary end planes defined by its inlet or outlet ends. End planes 280 form a single plane which provides easy duct joining.

It will be apparent to those skilled in the art that various modifications and variations can be made in the device of the present invention. Thus, it is intended that the present invention embraces all such modifications and variations within the spirit and scope of the appended claims.

What is claimed is:

1. An elbow silencer for attenuating noise associated with a fluid medium passing through said elbow silencer, the silencer being configured to turn the medium as it passes through the silencer from a first direction to a second direction, comprising
   a casing having sides that define an inlet end and an outlet end; and
   a baffle disposed within the casing, the baffle(s) defining a flow channel through which the fluid medium passes,
   wherein the elbow silencer is capable of being nested with a complementary elbow silencer having substantially the same length flow channel,
   wherein one of the sides of the casing complements one of the sides of a casing of a complementary elbow silencer so as to define the nested relationship, and
   wherein the complementing sides of the nested, complementary elbow silencers are curved.

2. An elbow silencer for attenuating noise associated with a fluid medium passing through said elbow silencer comprising:
   a casing having an inlet end opening for receiving the fluid medium into the silencer and outlet end opening through which the fluid medium exits the silencer, the casing further having an interior flow passage extending from the inlet end opening to the outlet end opening, the flow passage being configured to turn the medium passing through the silencer from a first direction in which the fluid medium enters the silencer to a second direction in which the fluid medium exists the silencer, the inlet and outlet end openings defining an inlet plane and an outlet plane, respectively, the inlet plane being disposed parallel to the outlet plane.

3. An elbow silencer as recited in claim 2 wherein the casing includes an exterior side portion and an interior side portion, said exterior side portion and interior side portion having complementary configurations such that the exterior side portion of a first silencer can be received in the interior side portion of a second silencer to form a nested composite silencer in which the inlet end openings of the first and second silencers define the same inlet plane and the outlet end opening of the first and second silencers define the same outlet plane.

4. An elbow silencer as recited in claim 2 wherein the interior flow passages of the first and second silencers have equal lengths.

5. A stacked composite elbow silencer comprising first and second silencers as recited in claim 2, the first and second silencers being stacked on one another to define a composite inlet opening and a composite outlet opening, the composite inlet opening defining a composite inlet plane and the composite outlet opening defining a composite outlet plane, the composite inlet plane being parallel to the composite outlet plane.

* * * * *